H. JAENISCH.
COOLING DEVICE FOR COOLING THE BUNG RINGS OF TRANSPORT CASKS DURING PITCHING.
APPLICATION FILED OCT. 20, 1910.

1,001,526.  Patented Aug. 22, 1911.

UNITED STATES PATENT OFFICE.

HEINRICH JAENISCH, OF KAISERSLAUTERN, GERMANY.

COOLING DEVICE FOR COOLING THE BUNG-RINGS OF TRANSPORT-CASKS DURING PITCHING.

1,001,526.     Specification of Letters Patent.     Patented Aug. 22, 1911.

Application filed October 20, 1910. Serial No. 588,179.

*To all whom it may concern:*

Be it known that I, HEINRICH JAENISCH, a subject of the German Emperor, and resident of Kaiserslautern, Palatinate, Germany, have invented certain new and useful Improvements in Cooling Devices for Cooling the Bung-Rings of Transport-Casks During Pitching, of which the following is a specification.

When the pitch is removed from transport casks and new pitch is introduced therein by means of pitch injecting and pitching apparatuses the pitch flowing back as well as hot gases, etc., evolved must escape from the cask between the pitch injecting pipe (pitch nozzle) and the bung ring. Owing to this fact and owing to the heat radiating from the pitch introducing pipe (pitch nozzle) the bung rings are heated to such a degree that often the wood of the bung stave is carbonized whereby the bung rings become loose. Now, the present invention does away with this drawback by inserting between the bung ring and the pitch injecting pipe (pitch nozzle) a cooling device comprising a cone cooled by circulating cold water and adapted to receive the bung ring of the cask and to support the latter. The excess of pitch and the hot escaping gases are allowed to escape freely between the pitch injecting pipe (pitch nozzle) and the cooled cone of the cooling body without the bung ring being heated.

Figure 1:
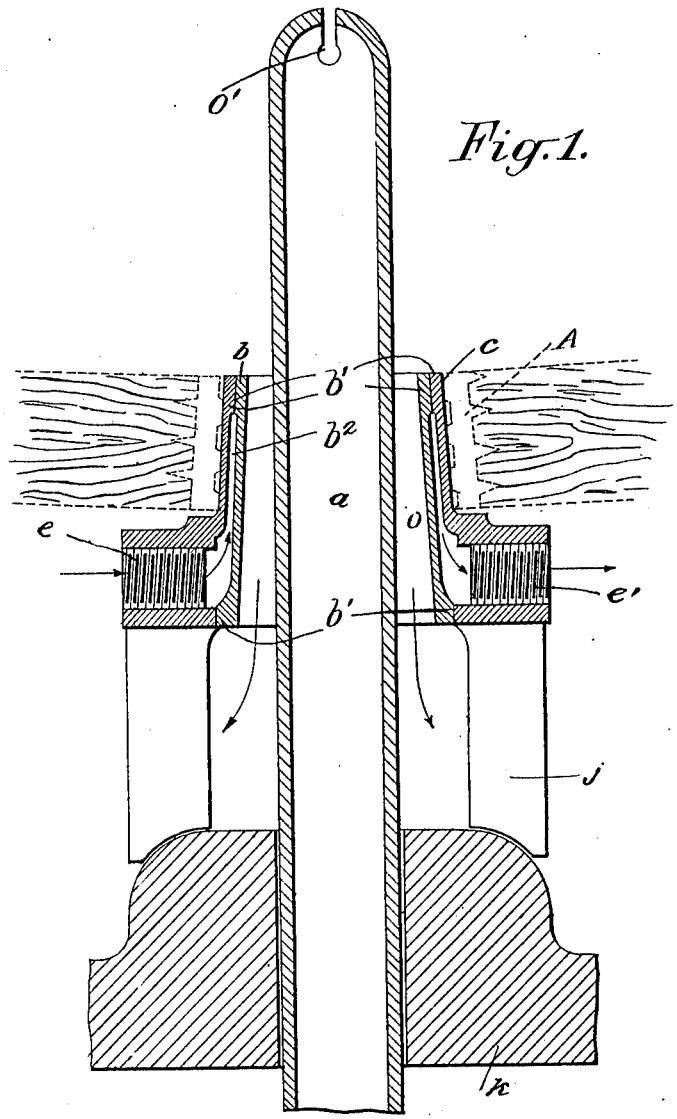
Figure 2:
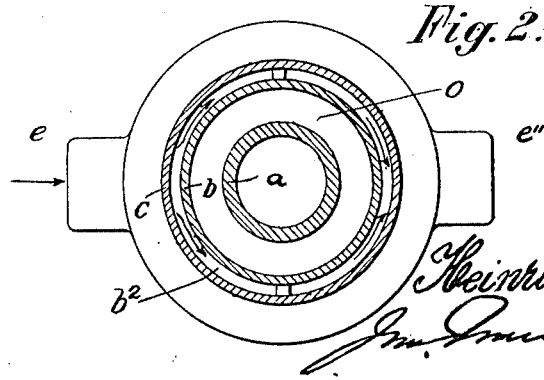

In the accompanying drawing: Figure 1 is a vertical longitudinal section of my improved bung bushing cooler. Fig. 2 is a cross section through the cooling device.

The cooling device comprises inner and outer tapering housings $b$ and $c$. The ends of the housings $b$ and $c$, are provided with inner abutting extensions $b'$, so that when the inner housing is fitted within the outer housing, the extensions, a space or chamber $b^2$, will be provided. The outer tapering housing is provided at one end with tubular extensions $c'$ and $e'$, which communicate with the chamber $b^2$, and projecting from the end of the outer housing are extensions or supports $j$.

A nozzle $a$, is passed through the opening $o$, in the inner housing, and at its inner end it is provided with a series of exit openings $o'$, while its outer end is provided with a support $k$, which engages the ends of the extensions $j$, to position the nozzle when the invention is in use. The ends of the extensions are curved to form a seat for the rounded portion of the support $k$, as clearly shown in Fig. 1.

In use, the cooling device is inserted in a bung hole, and a water (or air) supply pipe is attached to the tubular extension $e$. The water circulates in the chamber $b^2$, and passes through the tubular extension $e'$. The nozzle $a$, is then inserted in the opening $o$, of the cooling device, the support $k$, being seated in the curved seats of the extensions $j$, to center the nozzle, with reference to the cooling device.

By this construction, the bung ring $A$, is prevented from being heated when the hot pitch is passing through the nozzle, or by the hot pitch or gases escaping through the opening $o$.

I claim:—

In a cask-pitching device, the combination of an outer tapered housing provided with hollow extensions to form inlet and outlet tubes, extensions protruding from the outer tapering housing, and an inner tapering housing fitting within the outer tapering housing and formed at its upper and lower edges with outwardly projecting flanges which bear against the inner surface of the outer tapering housing to form a space with which the tubes communicate.

In testimony whereof I have hereunto set my hand in presence of two witnesses.

HEINRICH JAENISCH.

Witnesses:
  OTTO STUMPF,
  PHILIPP MÜLLER.